United States Patent [19]

Demuynck

[11] Patent Number: 5,363,435
[45] Date of Patent: Nov. 8, 1994

[54] METHOD AND APPARATUS FOR SEIZING A TRUNK CIRCUIT IN A TELECOMMUNICATIONS PRIVATE BRANCH EXCHANGE

[75] Inventor: Noel Demuynck, Zedelgem,

[73] Assignee: Siemens Aktiengesellschaft, Munich, Germany

[21] Appl. No.: 802,064

[22] Filed: Nov. 27, 1991

[30] Foreign Application Priority Data

Nov. 30, 1990 [DE] Germany .................. 4038320
Nov. 30, 1990 [DE] Germany .................. 4038321

[51] Int. Cl.⁵ ............................ H04M 3/20
[52] U.S. Cl. .................. 379/208; 379/257; 379/234
[58] Field of Search ......... 379/234, 208, 209, 161, 379/201, 257

[56] References Cited

U.S. PATENT DOCUMENTS

| | | | |
|---|---|---|---|
| 2,943,155 | 6/1960 | Rockwell | 379/208 |
| 3,917,910 | 11/1975 | Nielson | 379/209 |
| 3,944,750 | 3/1976 | Sobanski | 379/208 |
| 4,028,498 | 6/1977 | Mehaffey et al. | 379/234 |
| 4,096,358 | 6/1978 | Sidlack et al. | 379/208 |

FOREIGN PATENT DOCUMENTS 1-41551  2/1989  Japan .................. 379/208

OTHER PUBLICATIONS

"Mehr Telefonkomfort fur kleine und mittlere Betriebe", Richter, Telcom report 11 (1988) Heft, 5, pp. 186–188 (No Translation).
"Flexibel und universell vermitteln in privaten Kommunikationsnetzen" Burgmeier et al, Telcom report 10, (1987) Heft 4, pp. 231–235 (No Translation).
"ISDN-Kommunikationssystem, System Information", Bestell-Nr. 16.0012.1172/2-55 Egg7, pp. 7–30. (1987) (No Translation).
"Grundsatze und Systemmerkmale bei Fernsprech-und Datennetzen", by Oden R. Oldenburg Verlag Munchen, 1975, ISBN 3-486-39901-2, p. 78 (No Translation).
Siemens Product Data, HICOM 600 System, A191-00-K3161-G430-01-7600, p. 34.

*Primary Examiner*—James L. Dwyer
*Assistant Examiner*—Ahmad F. Matar
*Attorney, Agent, or Firm*—Hill, Steadman & Simpson

[57] ABSTRACT

Method and apparatus for seizing a truck circuit in a telecommunications private branch exchange. In traditional private branch exchange, internal extension that have previously not been participating in an exchange connection are excluded from setting up an exchange connection given complete usage with outgoing and/including exchange traffic until at least one previously existing exchange connection is over for the purpose of a chronologically immediate set-up of an exchange connection. The present method and apparatus provides that the central controller of the private branch exchange, triggered by a corresponding command of an internal extension, checks the occupied truck circuits for disconnectability that is defined by a given criterion. Given a positive result of the check, the controller disconnects a trunk circuit and allocates this to the internal extension that triggered the command.

18 Claims, 5 Drawing Sheets

METHOD AND APPARATUS FOR SEIZING A TRUNK CIRCUIT IN A TELECOMMUNICATIONS PRIVATE BRANCH EXCHANGE

BACKGROUND OF THE INVENTION

A variety of telecommunications private exchanges and, in particular, telephone private branch exchanges are known that, in addition to being capable of actual switching control, are also capable of control or realization of additional events that proceed beyond the actual switching event. Such additional functions are generally referred to as performance characteristics, whereby a great number of different performance characteristics are known particularly for "voice" communication service. Included among such performance characteristics are, in particular, the presentation of user instructions on an optical display means, call back in the no answer or busy condition of the called extension and busy override.

The performance characteristic of "busy override" enables extension subscribers to connect into the conversation and to speak during a call given a busy extension or a busy attendant's position. In busy override, a trunk offering tone is transmitted and all three participants are interconnected to form a conference. Busy override is not possible, for example, for extensions protected against busy override and for terminals with data protection. A performance characteristic is also known that is referred to as "displacing". The performance characteristic of "displacing" is that a connection in a switching system can be disconnected in favor of another connection having higher priority. It can be provided that the disconnection is indicated to the disconnected subscriber locations on the basis of a busy signal (Oden, Nachrichtenvermittlung, R. Oldenburg-Verlag Munich, 1975, ISBN-3-486-39902-2, page 78).

The extent of the exchange traffic from or to the private branch exchange is dependent on the number of what are referred to as outside trunk relay repeaters or trunk circuits with the respective exchange lines. As a rule, the number of extensions is greater than the number of exchange lines in private branch exchanges. In private branch exchanges that have more extensions than exchange lines, one or more extensions are excluded from outgoing exchange traffic as well as from incoming exchange traffic when all trunk circuits are occupied. The user of an extension who wishes to produce an exchange connection may have to repeatedly dial a traffic discrimination digit given a heavy usage of the private branch exchange with outgoing and/or incoming exchange traffic or given a high demand for exchange connections or may have to press a ground key in order to be able to ultimately produce the desired exchange connection.

A product brochure of Siemens AG "HICOM 600 System Product Data", Order No. A19100-K3161-G430-01-7600, discloses a communication system wherein external lines can be pre-noted (page 34 of the product data). When a subscriber receives the busy signal when attempting to seize an external line, he can make a queuing request for the next line to become free insofar as the appertaining extension subscriber has at least local authorization.

SUMMARY OF THE INVENTION

The present invention is based on the problem of enabling an exchange connection for extensions not previously participating in an exchange connection without chronological limitation even for complete usage of the private branch exchange with exchange traffic.

The advantages achieved with the present invention are particularly that the user of an extension who has previously not participated in an exchange connection because of complete usage of the private branch exchange with exchange traffic and who wishes to produce such an exchange connection is relieved of repeatedly undertaking an attempt to seize a trunk circuit. It is also superfluous to undertake a queuing request for an external line, whereby the reserved, external line could only then be allocated to a different extension when the original connection is terminated. In accordance with the present invention, however, the desired exchange connection can be produced at any time, i.e. even given complete usage of the private branch exchange with exchange traffic.

The user of that internal extension who wishes to produce an exchange connection can inventively designationally select one of a plurality of disconnectable trunk circuits. To that end, information is displayed on a display of this extension that references a second internal extension that is connected to a disconnectable trunk circuit. Therefore, instead of selecting a first, disconnectable trunk circuit, one or a successive plurality of further, disconnectable trunk circuits is selected in order to designationally except second, internal terminal equipment that are participating in an exchange connection, for example terminal equipment of superiors, from the disconnect of a trunk circuit.

It is provided in a further, advantageous embodiment of the method of the present invention that, triggered by a first command or by a second command of the first internal terminal equipment in the framework of a second connection, the central controller (in addition to checking the trunk circuit or trunk circuits for disconnectability) checks the second, internal terminal equipment connected to the respective trunk circuit for busy override capability. Given a positive result of the second check, the central controller connects the first, internal terminal equipment onto the second, internal terminal equipment, disconnects the appertaining, disconnectable trunk circuit and assigns this trunk circuit to the first, internal terminal equipment. The busy override enables the user of the extension who wishes to seize a trunk circuit and produce an exchange connection to inform the subscribers of the original connection of the desire to seize a trunk circuit. The busy override event that is inventively provided before the actual disconnect of the trunk circuit also makes it possible that, after the busy override, either the user of the first extension who wishes to seize the trunk circuit or the user of the second extension who is connected to the trunk circuit to be disconnected initiates the disconnect of the trunk circuit. Thus, on the one hand, a voice communication between both users is enabled and, second, a chronologically immediate disconnect of the trunk circuit is also enabled after the busy override.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
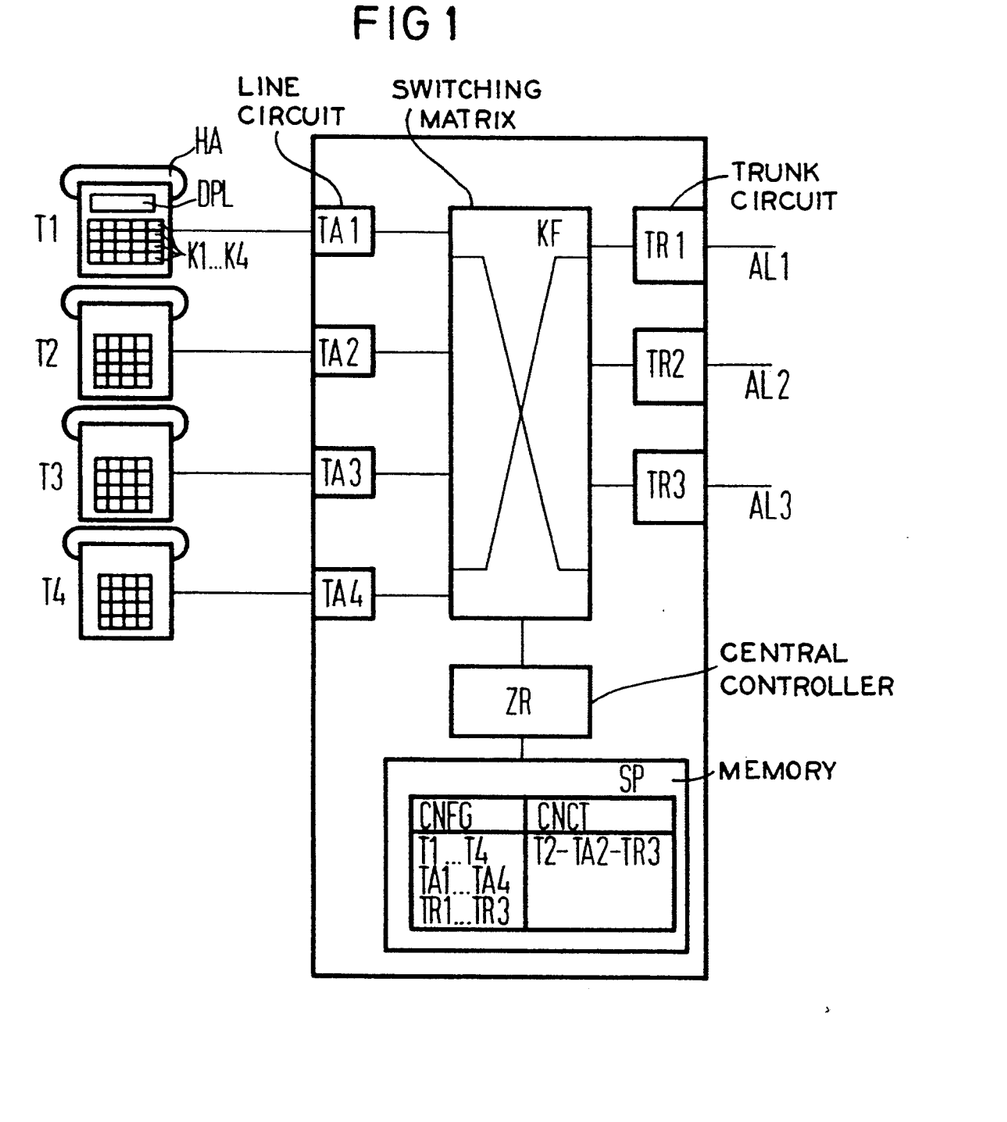
FIG. 1 is a block circuit diagram of a telecommunications private branch exchange that implements the method of the present invention.

The private branch exchange shown in FIG. 1 in the form of a block circuit diagram has a central controller ZR, a switching matrix KF, a memory SP that accepts system configuration data in one memory area CNFG and accepts information individually associated to connection status in another memory area CNCT. Internal terminal equipment T1 . . . T4 are connectable to the switching matrix via subscriber line circuits TA1 . . . TA4. In addition to having numerical keys, a first internal terminal equipment T1 also has function keys K1 . . . K4 with whose actuation instructions directed to the central controller ZR can be generated. The first internal terminal equipment T1 also has an optical display means DPL and, in particular, is also fashioned as an attendant console.

Trunk circuits TR1 . . . TR3 that serve the purpose of producing outgoing and/or incoming exchange traffic via the appertaining exchange lines AL1 . . . AL3 can also be connected to the switching matrix KF. The telephone private branch exchange illustrated in FIG. 1 thus has a plurality of internal terminal equipment T1 . . . T4 and trunk circuits TR1 . . . TR3.

The memory SP connected to the central controller ZR contains configuration data in its memory area CNFG, this configuration data defining the respectively specific system expansion of the private branch exchange. Included among this data are particulars regarding the plurality and the nature (analog-digital) of the terminal equipment T1 . . . T4, terminal-equipment-associated authorizations and particulars regarding the trunk circuits TR1 . . . TR3. The afore-mentioned, terminal-equipment-associated authorization data indicate what performance characteristics are allocated to the respective terminal equipment T1 . . . T4. It is assumed in the present case that the first internal terminal equipment T1 is authorized to generate the instructions serving for the initiation and implementation of the method of the present invention with the keys K1 . . . K4. A further configuration datum for the first internal terminal equipment T1 is the information that it is equipped with an optical display means DPL. Further terminal-equipment-associated configuration data indicate whether the performance characteristic "busy override" of the present invention is allocated to the individual terminal equipment whether there is a protection against busy override for these individual internal terminal equipment.

In addition to the configuration data that exists independently of the respective switching-oriented status of the system components, the memory SP also accepts data individually associated to connection status, namely in the memory area CNCT. For the internal terminal equipment, subscriber line circuits and trunk circuits, it contains information about the idle condition or, respectively, non-idle condition, whereby existing connections are designated by the participating system components, internal terminal equipment (B-subscribers), subscriber line circuits and trunk circuits. When, for example, there is an external connection between the internal terminal equipment of the subscriber line circuit TA2 and the trunk circuit TR3, then the central controller ZR forms information for each component T2, TA2, TR3 that references the two other components (see FIG. 1, memory SP CNCT). The information individually associated to connection status thus also indicate whether a specific internal terminal equipment is participating in an internal or in an external, bidirectional connection, in a conference call, or whether it is in a callback status, etc. The information individually associated to connection status that refer to trunk circuits also include information about the connection-status-dependent disconnectability of an occupied trunk circuit that shall be described later. This data is generated and administered in a known way by or in collaboration with the central controller ZR.

The central controller ZR has an operating program allocated to it that describes the steps of the method of the present invention.

Figure 2:
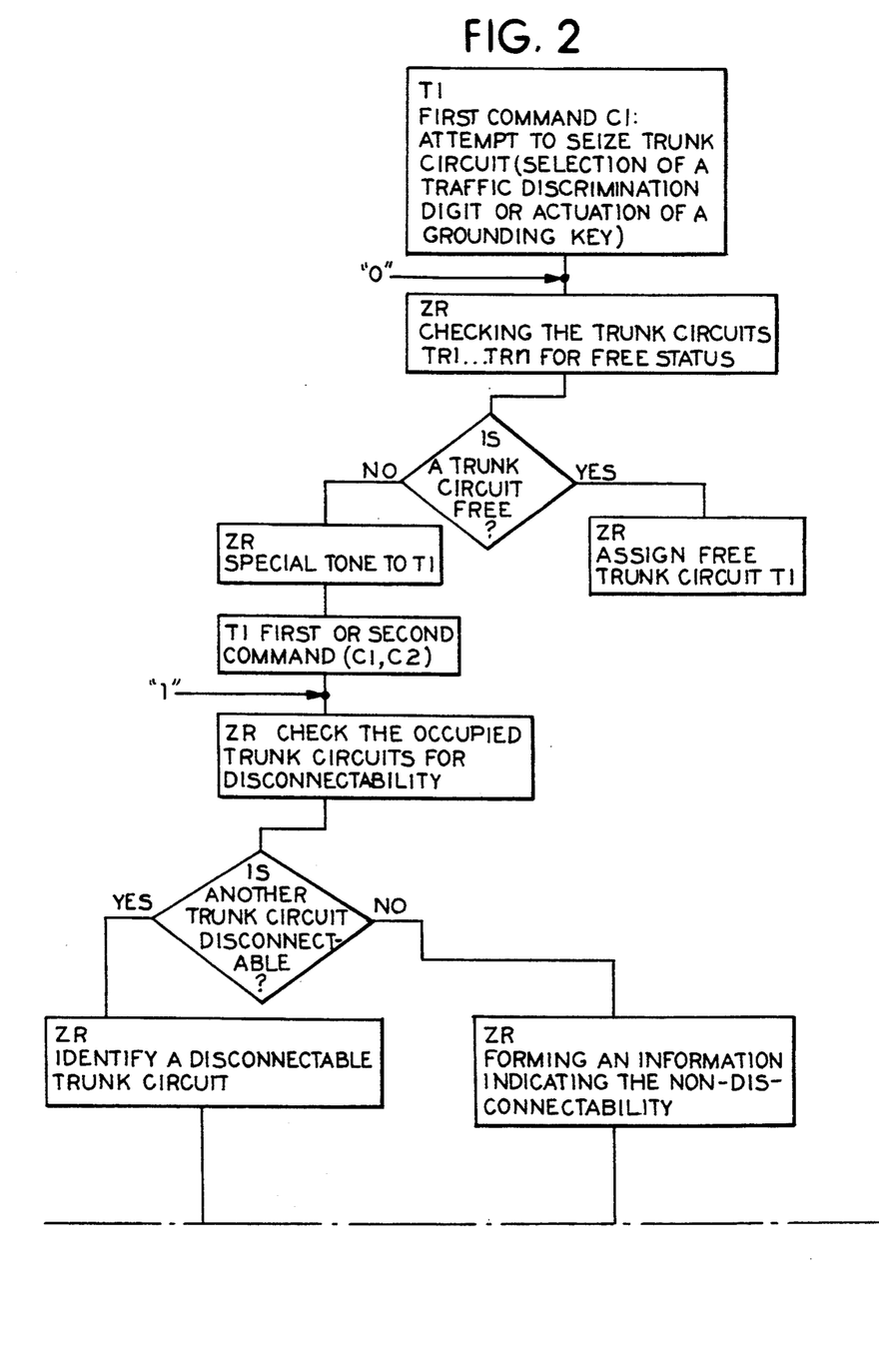
FIGS. 2 and 3 are flowcharts depicting the steps of a first embodiment of the method of the present invention.
Figure 3:
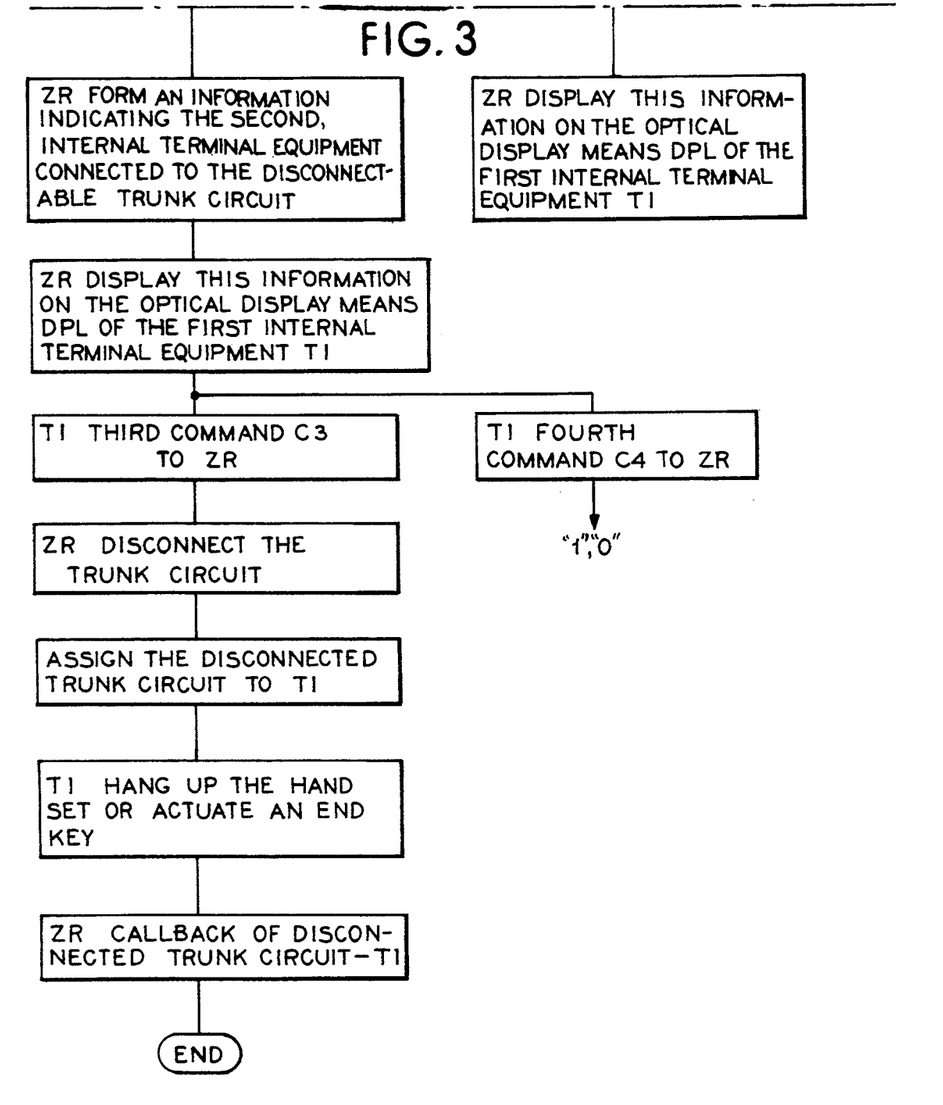

The first embodiment of the method of the present invention shown in FIGS. 2 and 3 in the form of a flowchart has the following steps: a first internal terminal equipment T1 attempts to seize a trunk circuit by dialing a traffic discrimination digit or by actuating a ground key K1. Triggered by this first command C1, the central controller ZR checks the trunk circuits TR1 . . . TR3 for idle condition in a known way within the framework of a first check. For this purpose, it accesses the trunk-line-related information individually associated to connection status in the memory area SP CNCT. When the central controller ZR identifies a free trunk circuit, then it allocates this free trunk circuit to the first terminal equipment T1. When, by contrast, the central controller ZR does not find a free trunk circuit within the framework of the first check, then it communicates a special tone (busy signal) to T1 in a way that is likewise known. Insofar as the first internal terminal equipment T1 is equipped with an optical display means DPL as identified by a corresponding configuration datum in the memory SP CNFG (this being assumed in the following) the central controller ZR can form information in addition to or alternatively to the special tone, this information indicating the non-idle condition of the trunk circuits and being displayed on the display DPL of the terminal equipment T1.

Triggered by the first command C1 of the internal terminal equipment T1 or by a second command C2 of the internal terminal equipment T1 that, for example, can be generated by actuating the key K2, the central controller ZR checks the occupied trunk circuits (for example, TR1, TR2, TR3) for disconnectability within the framework of a second check. The status of a trunk circuit as disconnectable can be defined internally within the system in, for example, such a way that only a trunk circuit that is participating in a bidirectional (telephone) connection is valid as disconnectable. Thus, among those trunk circuits that are deemed non-disconnectable are those trunk circuits participating in a conference call as well as dialed trunk circuits that are in fact seized but are not participating in a call.

For the second check to determine whether at least one trunk circuit is disconnectable the central controller ZR accesses the information in the memory SP CNCT that indicate the respective connection status of each and every trunk circuit TR1 . . . TR3. When this check by the central controller ZR shows that no trunk circuit is disconnectable, then it forms information indicating the non-disconnectability and conducts this to the first internal terminal equipment T1 where it is displayed on the optical display means DPL. When, by contrast, the central controller ZR finds at least one disconnectable trunk circuit within the framework of the second check, then it selects a (first) trunk circuit, for example TR1 (potentially according to a given rank sequence) that is defined by the priorities allocated to the internal terminal equipment T1 . . . T4 and configuration data corresponding thereto, and forms information that identifies the second internal terminal equipment T2 connected to the respective first, disconnectable trunk circuit, for example TR1. This information is also supplied to the first internal terminal equipment T1 and is also displayed on the optical display means DPL.

The method of the present invention is further executed in such a way that the central controller ZR does not disconnect the respective, first trunk circuit that is identified on the optical display means DPL by the second internal terminal equipment connected to it until the first internal terminal equipment T1 outputs a third command C3, for example with the key K3. This third command then triggers the disconnect of the respective, first trunk circuit. It can thereby be provided that the existing connection in which the first trunk circuit is participating is immediately ended. The central controller ZR assigns the disconnected trunk circuit TR1 to the first internal terminal equipment T1.

When the handset HA at the first internal terminal equipment T1 is not hung up, the central controller ZR connects the disconnected trunk circuit TR1 to the first internal terminal equipment T1 and potentially communicates a special tone thereto that indicates the busy override of the trunk circuit. When, by contrast, the handset HA is hung up at the first internal terminal equipment T1, then the central controller ZR calls the first internal terminal equipment T1 and, after the handset HA is picked up, connects the disconnected trunk circuit TR1 to the first internal terminal equipment T1.

The method of the present invention is further executed in such a way that the central controller ZR (following the selection of the first trunk circuit TR1 for a later disconnect and, potentially, following the display of an information indicating the appertaining, second internal terminal equipment T2 on the optical display means DPL of the first internal terminal equipment T1) selects a second trunk circuit TR2 for a later disconnect from the remaining, disconnectable trunk circuits, for example TR2 and TR3, selecting the second trunk circuit triggered by a further (fourth) command C4 (key K4) of the first internal terminal equipment T1. The fourth command, for example, can be generated with the key K4. The control program that is shown in FIG. 2 in the form of a flowchart returns to the location referenced with the numeral "1" in this case. The central controller ZR thus again checks the trunk circuits TR2, TR3 (which may still be occupied) for disconnectability, whereby the first trunk circuit TR1 is excluded from this check in the present case. After the controller forms information identifying that second internal terminal equipment T3 that is connected to the second disconnectable trunk circuit TR2 and after this information is displayed on the optical display means DPL of the first internal terminal equipment T1, the central controller ZR (triggered by the third command) disconnects the selected, second trunk circuit TR2 and assigns this second trunk circuit TR2 to the first internal terminal equipment T1.

The method of the present invention can also be fashioned such that the central controller ZR (triggered by the fourth command of the first internal terminal equipment T1 that can be generated by actuating the key K4) first checks whether a trunk circuit has returned into the idle condition in the meantime. In this case, the control program shown in FIGS. 2, 3 in the form of a flowchart returns to the location referenced with the numeral "0" in order to subsequently execute the further steps indicated in the flowchart.

Instead of the keys K1 . . . K4, it can be provided that the commands at the first internal terminal equipment T1 are triggered by actuating numerical keys. It is assumed for the second embodiment of the method of the present invention set forth below that the commands C1, C2', C5 and C6 used in the implementation of this embodiment are triggered by the actuation of numerical keys.

Figure 4:
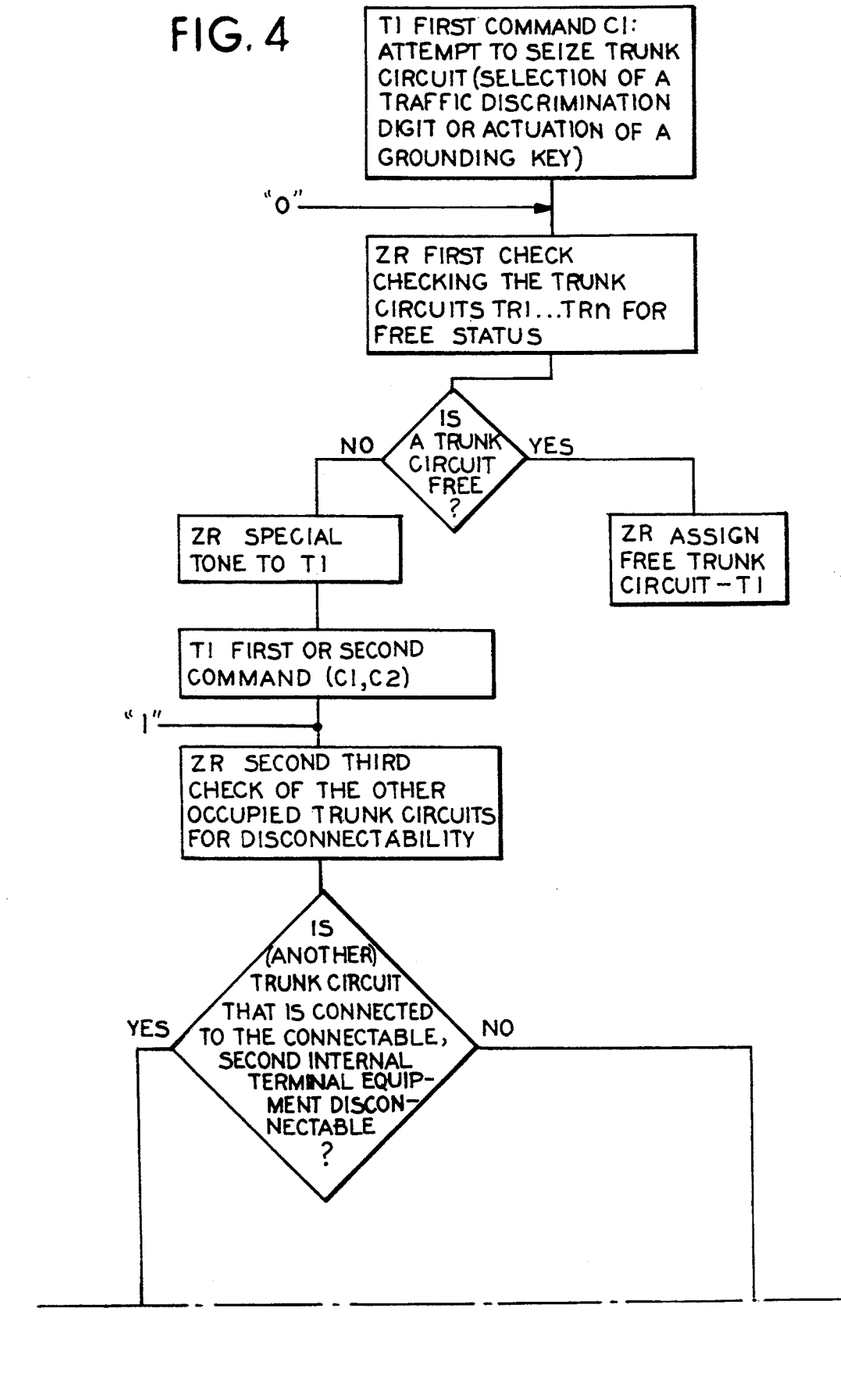
FIGS. 4 and 5 are flowcharts depicting the steps of a second embodiment of the method of the present invention.

The second embodiment of the method of the present invention shown in FIGS. 3 and 4 in the form of a flowchart has the following steps: a first internal terminal equipment T1 attempts to seize a trunk circuit by dialing a traffic discrimination digit or by actuating a ground key K1. Triggered by this first command C1, the central controller ZR checks within the framework of a first check (as already set forth) to determine whether the trunk circuits TR1 . . . TR3 are in idle condition. To this end, it accesses the trunk-circuit-related information individually associated to the connection status in the memory area SP CNCT. When the central controller ZR finds a free trunk circuit, then it allocates this free trunk circuit to the first terminal equipment T1. When, by contrast, the central controller ZR does not find a free trunk circuit, then (in a way that is likewise known) it communicates a special tone (busy signal) to T1. In addition to or alternatively to the special tone, the central controller ZR forms information that indicates the non-idle-condition of the trunk circuits and displays this information on the display DPL of the terminal equipment TI. This first, above-described step is identical to the first step of the first embodiment of the method of the present invention.

Figure 5:
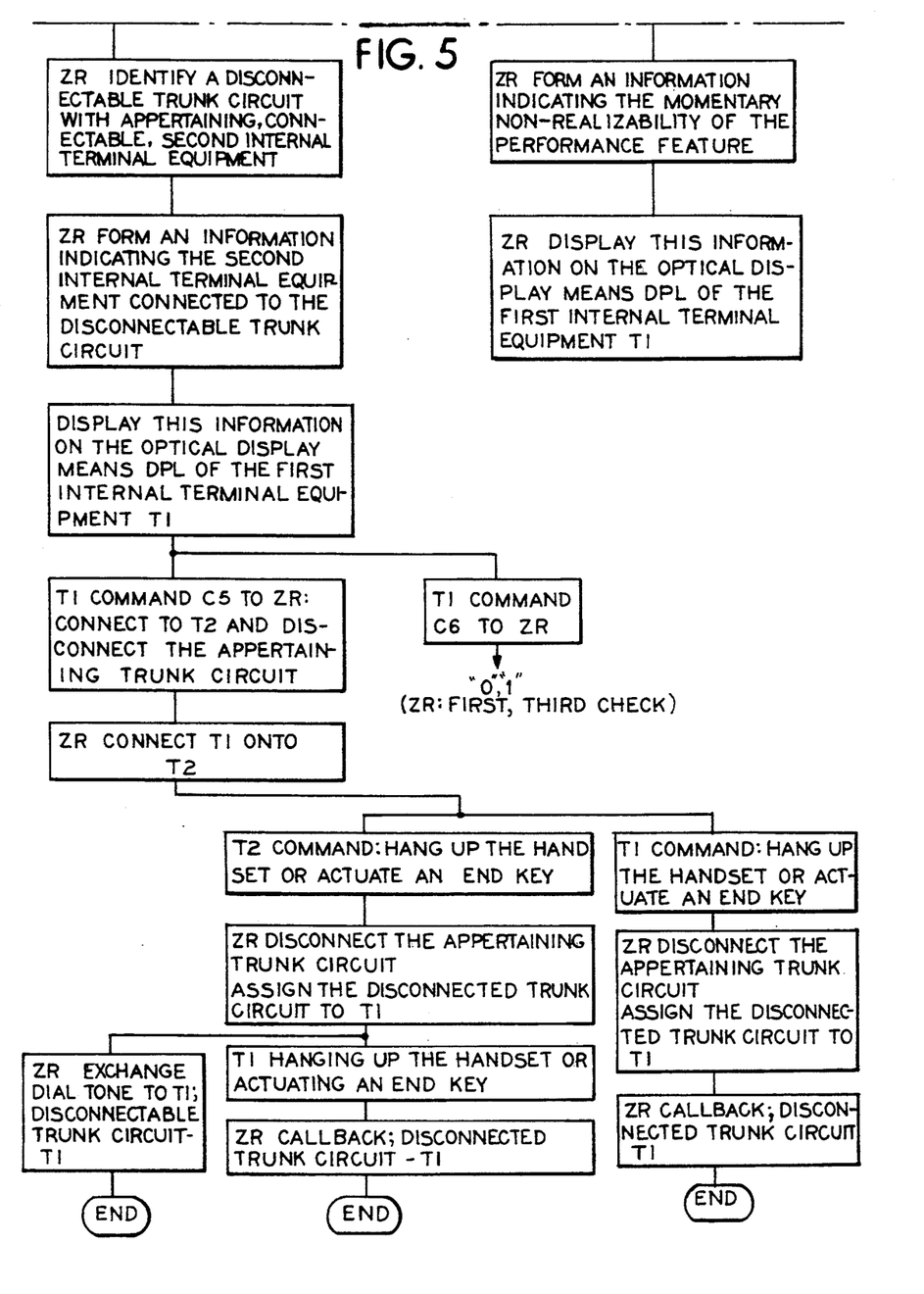

Triggered by the first command C1 of the first internal terminal equipment T1 or by a second command C2' of the internal terminal equipment T1 that, for example, can be generated by actuating the key K2, the central controller ZR undertakes a second check that is initially directed thereto to determine whether the trunk circuits TR1 . . . TRn of the telecommunications private branch exchange are disconnectable according to the above-described, given criterion. In addition thereto, this second check is directed thereto to determine whether an appertaining, second internal terminal equipment connected to the respective trunk circuit is subject to a busy override. Given a positive result of the second check, the central controller ZR connects the first internal terminal equipment T1 onto the second internal terminal equipment T2, disconnects the appertaining, disconnectable trunk circuit TR1 and allocates this trunk circuit TR1 to the first internal terminal equipment T1.

For checking whether at least one trunk circuit is disconnectable, the central controller ZR (as already set forth) accesses the information in the memory area SP CNCT that identify the respective connection status of each and every trunk circuit TR1 . . . TR3. For the check whether a second internal terminal equipment that is connected to a disconnectable trunk circuit has a protection against busy override allocated to it or alternatively thereto, whether this second internal terminal equipment has a busy override, the central controller ZR accesses the system configuration data in the memory area SP CNFG. In this embodiment of the method of the present invention, the second check supplies a negative result when either no trunk circuit is disconnectable or, respectively, when a disconnectable trunk circuit is connected to a second internal terminal equipment that is protected against busy override. The second check in this embodiment of the method of the present invention, by contrast, supplies a positive result when at least one disconnectable trunk circuit is found that is connected to a disconnectable, second internal terminal equipment.

When, during the course of this second check, the central controller ZR finds at least one disconnectable trunk circuit, then it selects a trunk circuit, for example TR1 (potentially according to a given rank sequence) that is defined by priorities allocated to the second internal terminal equipment T1 . . . T4 and defined by configuration data corresponding thereto. After the central controller ZR has found a disconnectable trunk circuit, it continues to check during the course of this second check whether the appertaining, second internal terminal equipment has a protection against busy override allocated to it. Given a positive result of the second check, the central controller forms information that identifies the second internal, terminal equipment T2 connected to the respective disconnectable trunk circuit. This information is supplied to the first internal terminal equipment T1 and is displayed on the optical display means DPL.

When, by contrast, this second check supplies a negative result, the central controller ZR forms information that indicates the momentary non-realizability of the performance characteristic of the present invention. This information is supplied to the first internal terminal equipment T1 by the central controller ZR and is displayed on the optical display means DPL.

The second embodiment of the method of the present invention, in particular, can also be fashioned in such a way that the central controller ZR (given a positive result of the second check) only disconnects the respective trunk circuit that is identified by the second internal terminal equipment connected to it on the optical display means DPL when the first internal terminal equipment T1 outputs a further, fifth command C5, for example with the (busy override) key K3. This command C5 then initiates the busy override of the terminal equipment T1 onto the terminal equipment T2 as well as the disconnect of the respective trunk circuit.

Insofar as a busy override onto the second internal terminal equipment displayed on the optical display means DPL is not to occur, the first internal terminal equipment T1 can trigger a third check of trunk circuits and appertaining terminal equipment in accordance with the above-described second check on the basis of a further, sixth command C6 directed to the central controller ZR. The command C6, for example, can be generated with the key K4. The control program that is shown in FIGS. 4 and 5 in the form of a flowchart returns to the location referenced with numeral "1" in this case. The central controller ZR thus again checks the occupied trunk circuits for disconnectability, whereby the first trunk circuit is excluded from this check in the present case. When a disconnectable trunk circuit is found, the central controller ZR checks whether the appertaining, second internal terminal equipment has a protection against busy override allocated to it or whether a busy override can occur. Dependent on a positive or negative result of the third check, the method steps disclosed with reference to FIGS. 4 and 5 are implemented.

The control program can also be fashioned in such a way that the central controller ZR (triggered by the command C6 of the first internal terminal equipment T1 that can be generated by actuation of the key K4) first checks whether a trunk circuit has returned into the idle condition in the meantime. In this case, the control program shown in FIGS. 4 and 5 in the form of a flowchart returns to the location referenced with numeral "0" in order to subsequently execute the further steps indicated in the flowchart.

A further development of the method of the present invention provides that the disconnect of a trunk circuit identified as disconnectable and for which a second internal terminal equipment that has busy override has been found is only triggered by a command generated by this second internal terminal equipment. In particular, this command is generated by hanging up the handset of the second internal terminal equipment or by actuating a disconnect button of the second internal terminal equipment. After the busy override, the first internal terminal equipment T1 that is connected onto the second internal terminal equipment can optionally depart from the connection originally existing between the second internal terminal equipment and an external terminal equipment by hanging up its handset or by actuating a disconnect button. In this case, the central controller calls back the first internal terminal equipment, whereat the handset is hung up or at which a disconnect button had been actuated, after the second internal terminal equipment has hung up the handset or has actuated a disconnect button and connects the disconnected trunk circuit.

The callback procedure can occur in a known way upon employment of a software module used for the realization of the performance characteristic "callback on no answer" or, respectively, "callback on". When, after the connection of T1 onto T2 and after the handset of T2 has been hung up or after actuation of the T2 disconnect button, the T1 handset had not been hung up at the first internal terminal equipment or the T1 disconnect button had not been actuated thereat, the central controller ZR transmits the exchange dial tone to the first internal terminal equipment T1 and thus signals that T1 is connected to the disconnected trunk circuit.

After the busy override of T1 onto T2, the disconnect of the appertaining trunk circuit can also be triggered by a command generated by T1. T1 forms this command by hanging up the T1 handset or by actuating the T1 disconnect button before T2 hangs up the handset or actuates the disconnect button. In this case, the central controller ZR disconnects the appertaining trunk circuit independently of an action of the second internal terminal equipment T2 and assigns the disconnected trunk circuit T1. The controller ZR calls T1 back, potentially upon employment of a software module used for the realization of the performance characteristic of "callback no on answer" or, respectively, "callback on busy".

The method of the present invention can be implemented in its first or second embodiment without T1 triggering the command C3 or C4 (FIG. 3) or, respectively, the command C5 or C6 (FIG. 5) after the presentation of the information identifying T2 on the display DPL. The disconnect of the trunk circuit (FIG. 3) or, respectively, the busy override of T1 onto T2 (FIG. 5) then thus occurs immediately after the display of the information identifying T2 on the display DPL.

The invention is not limited to the particular details of the apparatus and method depicted and other modifications and applications are contemplated. Certain other changes may be made in the above described apparatus and method without departing from the true spirit and scope of the invention herein involved. It is intended, therefore, that the subject matter in the above depiction shall be interpreted as illustrative and not in a limiting sense.

What is claimed is:

1. A method for seizing a trunk circuit in a telecommunications private branch exchange having a central controller connected to a memory for the acceptance of system configuration data and of connection-status-associated information and having a plurality of trunk circuits and a plurality of internal terminal equipment, comprising the steps of: the central controller, triggered by a first command of a first internal terminal equipment identifying a request to seize a trunk circuit, checking the trunk circuits of the telecommunications private branch exchange for idle condition within the framework of a first check; if the central control does not find a free trunk circuit in the first check, the central controller, triggered by the first command or by a second command of the first internal terminal equipment, checking the trunk circuits of the telecommunications private branch exchange for disconnectability, defined according to a given criterion, during the framework of a second check; the central controller forming information identifying the result of the second check such that information identifying a second internal terminal equipment that is connected to a respective disconnectable trunk circuit is displayed on an optical display means of the first internal terminal equipment allocated to the first internal terminal equipment; and the central controller executing one of the following steps, triggered by a third command of the first internal terminal equipment, the central controller disconnecting a first disconnectable trunk circuit that is connected to the second internal terminal equipment indicated on the display means of the first internal terminal equipment and allocating the disconnected first disconnectable trunk circuit to the first internal terminal equipment, or, triggered by a further command of the first internal terminal equipment, selecting a second disconnectable trunk circuit from remaining disconnectable trunk circuits for a later disconnect and forming information identifying a further internal terminal equipment that is connected to the second disconnectable trunk circuit, and the central controller disconnecting the selected second disconnectable trunk circuit and allocating the second disconnectable trunk circuit to the first internal terminal equipment.

2. The method according to claim 1, wherein the central controller selects a trunk circuit for a later disconnect from the disconnectable trunk circuits according to a prescribable rank sequence.

3. The method according to claim 1, wherein the method further comprises: the central controller, triggered by the first command or by the second command of the first internal terminal equipment, checking the appertaining, second internal terminal equipment connected to the respective trunk circuit for busy override within the framework of the second check in addition to the check of the trunk circuits for disconnectability; and the central controller, given a positive result of the second check, busy overriding the first internal terminal equipment onto the second internal terminal equipment, disconnecting the appertaining, disconnectable trunk circuit and allocating the appertaining, disconnectable trunk circuit to the first internal terminal equipment.

4. The method according to claim 3, wherein the disconnect of the trunk circuit is triggered by a predetermined command generated by the second internal terminal equipment.

5. The method according to claim 4, wherein the predetermined command is generated by hanging up a handset of the second internal terminal equipment or by actuating a disconnect button of the second internal terminal equipment.

6. The method according to claim 3, wherein the central controller, triggered by the first command or by the second command of the first internal terminal equipment, forms information identifying the result of the second check such that information identifying the second internal terminal equipment is displayed on the display means of the first internal terminal equipment.

7. The method according to claim 6, wherein the central controller, given a positive result of the second check and following the display of the information identifying the second internal terminal equipment on the display means of the first internal terminal equipment, connects the first internal terminal equipment onto the second internal terminal equipment triggered by a further command of the first internal terminal equipment, disconnects the appertaining, disconnectable trunk circuit, and allocates the appertaining, disconnectable trunk circuit to the first internal terminal equipment.

8. The method according to claim 6, wherein the central controller, given a positive result of the second check and following the display of the information identifying the second internal terminal equipment on the display means of the first internal terminal equipment, implements a third check triggered by a further command of the first internal terminal equipment to determine whether the remaining trunk circuits are free or busy and disconnectable and are also connected to an appertaining, second internal terminal equipment capable of busy override; wherein the central controller allocates the free trunk circuit to the first internal terminal equipment or forms information identifying the further, internal terminal equipment that is connected to a further, disconnectable trunk circuit and, after displaying such information on the display unit of the first internal terminal equipment, busy overrides the first internal terminal equipment onto a connection existing with the further, internal terminal equipment, disconnects the further, disconnectable trunk circuit and allocates the disconnected trunk circuit to the first internal terminal equipment.

9. Telecommunications private branch exchange for implementation of a method for seizing a trunk circuit, comprising: a central controller, connected to a memory for the acceptance of system configuration data and connection-status-associated data, at least one trunk circuit and a plurality of internal terminal equipment, the central controller having a program for executing the method, wherein the program executes the method for seizing a trunk circuit in the telecommunications private branch exchange wherein, the central controller, triggered by a first command of a first internal terminal equipment identifying a request to seize a trunk circuit, checks the trunk circuits of the telecommunications private branch exchange for idle condition within the framework of a first check, if the central control does not find a free trunk circuit in the first check, the central controller, triggered by the first command or by a second command of the first internal terminal equipment, checks the trunk circuits of the telecommunications private branch exchange for disconnectability, defined according to a given criterion, during the framework of a second check; the central controller forming information identifying the result of the second check such that information identifying a second internal terminal equipment that is connected to a respective disconnectable trunk circuit is displayed on an optical display means of the first internal terminal equipment allocated to the first internal terminal equipment, and the central controller executes one of the following steps, triggered by a third command of the first internal terminal equipment, the central controller disconnects a first disconnectable trunk circuit that is connected to the second internal terminal equipment indicated on the display means of the first internal terminal equipment and allocates the disconnected first disconnectable trunk circuit to the first internal terminal equipment, or, triggered by a further command of the first internal terminal equipment, selects a second disconnectable trunk circuit from remaining disconnectable trunk circuits for a later disconnect and forms information identifying a further internal terminal equipment that is connected to the second disconnectable trunk circuit, and the central controller disconnects the selected second disconnectable trunk circuit and allocates the second disconnectable trunk circuit to the first internal terminal equipment.

10. The method according to claim 1, wherein if the central controller does not find a free trunk circuit in the first check, the central controller transmits a special tone to the first internal terminal equipment.

11. A method for seizing a trunk circuit in a telecommunications private branch exchange having a central controller connected to a memory for the acceptance of system configuration data and of connection-status associated information and having a plurality of trunk circuits and a plurality of internal terminal equipment, comprising the steps of: the central controller, trigger by a first command of a first internal terminal equipment identifying a request to seize a trunk circuit, checking the trunk circuits of the telecommunications private branch exchange for idle condition within the framework of a first check; if the central control does not find a free trunk circuit in the first check, the central controller, trigger by a second command of the first internal terminal equipment, checking the trunk circuits of the telecommunications private branch exchange for disconnectability, defined according to a given criterion, during the framework of a second check; the central controller forming information identifying the result of the second check such that information identifying a second internal terminal equipment that is connected to a respective disconnectable trunk circuit is displayed on an optical display means of the first internal terminal equipment allocated to the first internal terminal equipment, and, triggered by the second command of the first internal terminal equipment, checking the appertaining, second internal terminal equipment connected to the respective trunk circuit for busy override within the framework of the second check in addition to the check of the trunk circuits for disconnectability; and the central controller executing one of the following steps, triggered by a third command of the first internal terminal equipment and given a positive result of the second check, the central controller busy overriding the first internal terminal equipment onto the second internal terminal equipment and disconnecting a first disconnectable trunk circuit that is connected to the second internal terminal equipment indicated on the display means of the first internal terminal equipment and allocating the disconnected first disconnectable trunk circuit to the first internal terminal equipment, or, triggered by a further command of the first internal terminal equipment, selecting a second disconnectable trunk circuit from remaining disconnectable trunk circuits for a later disconnect and forming information identifying a further internal terminal equipment that is connected to the second disconnectable trunk circuit, and the central controller disconnecting the selected second disconnectable trunk circuit and allocating the second disconnectable trunk circuit to the first internal terminal equipment.

12. The method according to claim 11, wherein the central controller selects a trunk circuit for a later disconnect from the disconnectable trunk circuits according to a prescribable rank sequence.

13. The method according to claim 11, wherein the disconnect of the trunk circuit is triggered by a predetermined command generated by the second internal terminal equipment.

14. The method according to claim 13, wherein the predetermined command is generated by hanging up a handset of the second internal terminal equipment or by actuating a disconnect button of the second internal terminal equipment.

15. The method according to claim 11, wherein the central controller, triggered by the first command or by the second command of the first internal terminal equipment, forms information identifying the result of the second check such that information identifying the second internal terminal equipment is displayed on the display means of the first internal terminal equipment.

16. The method according to claim 15, wherein the central controller, given a positive result of the second check and following the display of the information identifying the second internal terminal equipment on the display means of the first internal terminal equipment, connects the first internal terminal equipment onto the second internal terminal equipment triggered by a further command of the first internal terminal equipment, disconnects the appertaining, disconnectable trunk circuit, and allocates the appertaining, disconnectable trunk circuit to the first internal terminal equipment.

17. The method according to claim 15, wherein the central controller, given a positive result of the second check and following the display of the information identifying the second internal terminal equipment on the display means of the first internal terminal equipment, implements a third check triggered by a further command of the first internal terminal equipment to determine whether the remaining trunk circuits are free or busy and disconnectable and are also connected to an appertaining, second internal terminal equipment capable of busy override; wherein the central controller allocates the free trunk circuit to the first internal terminal equipment or forms information identifying the further, internal terminal equipment that is connected to a further, disconnectable trunk circuit and, after displaying such information on the display unit of the first internal terminal equipment, busy overrides the first internal terminal equipment onto a connection existing with the further, internal terminal equipment, disconnects the further, disconnectable trunk circuit and allocates the disconnected trunk circuit to the first internal terminal equipment.

18. A method for seizing a trunk circuit in a telecommunications private branch exchange having a central controller connected to a memory for the acceptance of system configuration data and of connection-status-associated information and having a plurality of trunk circuits and a plurality of internal terminal equipment, comprising the steps of: the central controller, triggered by a first command of a first internal terminal equipment identifying a request to seize a trunk circuit, checking the trunk circuits of the telecommunications private branch exchange for idle condition within the framework of a first check; if the central control does not find a free trunk circuit in the first check, the central controller, triggered by a second command of the first internal terminal equipment, checking the trunk circuits of the telecommunications private branch exchange for disconnectability, defined according to a given criterion, during the framework of a second check; the central controller forming information identifying the result of the second check such that information identifying a second internal terminal equipment that is connected to a respective disconnectable trunk circuit is displayed on an optical display means of the first internal terminal equipment allocated to the first internal terminal equipment; and the central controller executing one of the following steps, triggered by a third command of the first internal terminal equipment, the central controller disconnecting a first disconnectable trunk circuit that is connected to the second internal terminal equipment indicated on the display means of the first internal terminal equipment and allocating the disconnected first disconnectable trunk circuit to the first internal terminal equipment, or, triggered by a further command of the first internal terminal equipment, selecting a second disconnectable trunk circuit from remaining disconnectable trunk circuits for a later disconnect and forming information identifying a further internal terminal equipment that is connected to the second disconnectable trunk circuit, and the central controller disconnecting the selected second disconnectable trunk circuit and allocating the second disconnectable trunk circuit to the first internal terminal equipment.

* * * * *